Figures 1, 2:
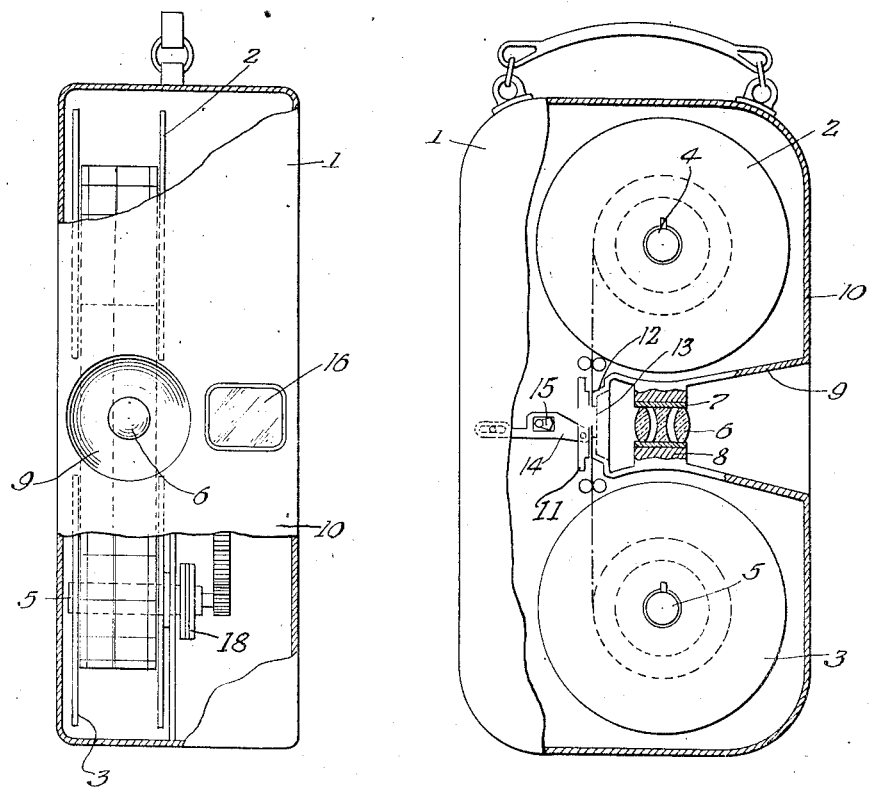

Dec. 31, 1940.  W. RIEDEL  2,226,638

MOTION PICTURE CAMERA

Filed Jan. 30, 1939

Inventor:
Walter Riedel
By B. Singer & F. Stern
Attys.

Patented Dec. 31, 1940

2,226,638

UNITED STATES PATENT OFFICE 2,226,638

MOTION PICTURE CAMERA

Walter Riedel, Dresden, Germany, assignor to Zeiss Ikon Aktiengesellschaft, Dresden, Germany Application January 30, 1939, Serial No. 253,487
In Germany February 11, 1938

3 Claims. (Cl. 88—18)

The invention relates to improvements in motion picture cameras and in particular is directed to a novel arrangement of the film gate and the camera objective in the interior of the camera casing.

The principal object of the invention is to mount the film gate and the camera objective in the space between two vertically spaced film spools, one of which serves as a film supply spool and the other as a film take-up spool. In this manner the film may be guided in a substantially straight line from one spool to another and thereby pass through the film gate. Since the conventional film spools are wound with the light sensitive layer on the inner side of the film, it is very simple to mount the film gate and camera objective in the described manner.

Other objects of the invention will be apparent or will be specifically pointed out in the description forming a part of this specification. The invention, however, is not limited to the embodiment of the invention herein described, as various forms may be adopted within the scope of the claims.

Referring to the drawing:

Fig. 1 is a front elevation view of a motion picture camera of the invention, with a portion of the front wall broken away, and Fig. 2 is a side elevation view of the same motion picture camera, with a portion of the side wall broken away and other portions in sectional view.

The camera casing 1 has mounted therein two removable film spools 2 and 3 on spaced parallel shafts 4 and 5 respectively. The camera objective 6 is mounted between the two film spools 2 and 3 and its mounting 7 is attached to a bracket 8 which is connected with the front wall 10 of the camera casing 1 by a conical member 9 forming a lens shade. The film gate 11 is provided with a stationary plate 12 containing the picture window 13. The plate 12 is supported by the bracket 8 as shown. A movably mounted member 14 for intermittently advancing the film is actuated by a customary eccenter 15 which is driven by a spring motor (not shown). The spring motor also drives shaft 5 of the take-up spool 3 by a friction clutch 18.

The film, when being unwound from the supply spool 2 is guided in a substantially straight line directly to the film gate 11 and then directly to the take-up spool 3.

The finder 16 is mounted within the camera casing directly adjacent the axis of the camera objective. Preferably, the axes of the camera objective and finder are arranged in the same horizontal plane.

What I claim as my invention is:

1. In a motion picture camera, a camera casing having a front wall provided with an aperture, two spaced parallel shafts within said casing above and below an horizontal axis passing through said aperture and adapted to receive a film supply spool and a film take-up spool respectively, a camera objective within said camera casing between said spaced parallel shafts and in axial alinement with the said aperture in said front wall, said parallel shafts being spaced from each other a distance just sufficient to permit the mounting of said objective in the narrowest portion of the space formed between the two film spools when the latter are mounted on their respective shafts, a bracket for supporting said camera objective, a tubular wall extending from the edge of the aperture in said front wall to said camera objective and forming a lens shade, said bracket being connected with said tubular wall, a film gate in rear of said objective and in a position for guiding the film in a substantial straight line from said supply spool to said take-up spool, said film gate including a stationary plate provided with a picture window, said stationary plate being attached to said bracket, and means in rear of said gate for intermittently advancing the film through said film gate.

2. In a motion picture camera, a camera casing having a front wall provided with an aperture, two spaced parallel shafts within said casing above and below an horizontal axis passing through said aperture and adapted to receive a film supply spool and a film take-up spool respectively, a camera objective within said camera casing between said spaced parallel shafts and in axial alinement with the said aperture in said front wall, said parallel shafts being spaced from each other a distance just sufficient to permit the mounting of said objective in the narrowest portion of the space formed between the two film spools when the latter are mounted on their respective shafts, a conical wall extending from the edge of the aperture in said front wall to said camera objective and forming a lens shade, a bracket for supporting said camera objective and connected with the inner end of said conical wall, a film gate in rear of said objective and in a position for guiding the film in a substantial straight line from said supply spool to said take-up spool, said film gate including a stationary plate provided with a picture window, said stationary plate being attached to said bracket, and means in rear of said gate for intermittently advancing the film through said film gate.

3. In a motion picture camera, a camera casing having a front wall with an aperture and a rear wall, two spaced parallel shafts within said casing above and below an horizontal axis passing through said aperture and adapted to receive a film supply spool and a film take-up spool respectively, a camera objective within said camera casing in axial alinement with said aperture and substantially midway between said front and rear wall, said parallel shafts being spaced from each other a distance just sufficient to permit the mounting of said objective in the narrowest portion of the space formed between the two film spools when the latter are mounted on their respective shafts, a conical wall extending from the edge of the aperture in said front wall to said camera objective and forming a lens shade, a bracket for supporting said camera objective and connected with the inner end of said conical wall, a film gate in rear of said objective and in a position for guiding the film in a substantial straight line from said supply spool to said take-up spool, said film gate including a stationary plate provided with a picture window, said stationary plate being attached to said bracket, and means mounted in rear of said gate for intermittently engaging the film in said gate and advancing the film through said film gate.

WALTER RIEDEL.